(12) United States Patent
Meyer et al.

(10) Patent No.: US 6,781,271 B2
(45) Date of Patent: Aug. 24, 2004

(54) SMOOTHING APPARATUS WITH DRIVE MOTOR DIRECTLY COUPLED TO THE SMOOTHING ROLL

(75) Inventors: Helmut Meyer, Troisdorf (DE); Joachim Lieven, Brühl (DE)

(73) Assignee: Reifenhauser GmbH & Co. Maschinenfabrik, Troisdorf (DE)

( * ) Notice: Subject to any disclaimer, the term of this patent is extended or adjusted under 35 U.S.C. 154(b) by 0 days.

(21) Appl. No.: 10/458,084

(22) Filed: Jun. 10, 2003

(65) Prior Publication Data

US 2004/0000826 A1 Jan. 1, 2004

(51) Int. Cl.[7] ............................................. G09B 23/18
(52) U.S. Cl. ..................... 310/98; 310/75 R; 310/118
(58) Field of Search ..................... 310/98, 75 R, 310/114, 115, 118

(56) References Cited

U.S. PATENT DOCUMENTS

| | | | | |
|---|---|---|---|---|
| 3,881,665 A | * | 5/1975 | Leloux | 242/521 |
| 4,210,832 A | * | 7/1980 | Ascoli | 310/50 |
| 5,056,202 A | * | 10/1991 | Stiegler | 29/33 P |
| 5,107,734 A | * | 4/1992 | Armbruster | 83/205 |
| 5,413,265 A | * | 5/1995 | Stahl et al. | 226/188 |
| 5,881,965 A | * | 3/1999 | Doell et al. | 242/563.1 |

* cited by examiner

*Primary Examiner*—Thanh Lam
(74) *Attorney, Agent, or Firm*—Herbert Dubno

(57) ABSTRACT

A smoothing roll for an apparatus for smoothing plastic foils and plates is driven directly by a rotor coaxially received with a stator in an outer housing with the rotor supported by a bearing on the outer housing or on a part of the housing extending coaxially into the rotor. The vibration-free arrangement eliminates chatter marks on the smoothed product.

12 Claims, 2 Drawing Sheets

SMOOTHING APPARATUS WITH DRIVE MOTOR DIRECTLY COUPLED TO THE SMOOTHING ROLL

FIELD OF THE INVENTION

Our present invention relates to a smoothing apparatus and, more particularly, to an apparatus for the smoothing of foils and plates generally of plastic and having a smoothing roll and a smoothing roll drive.

BACKGROUND OF THE INVENTION

A smoothing apparatus for smoothing of foils and plates of plastic can have a smoothing roll and a smoothing roll drive. Such an apparatus may be used in the production of plastic foils or plastic webs and plastic plates, for example in the context of deep drawing units designed to shape foils or plates. They usually have a plurality of smoothing rolls, for example three smoothing rolls, located one after the other and which serve by contact with the surface of the plastic to remove irregularities therefrom. In the past, such smoothing rolls have been driven by electric motors through appropriate transmissions. However, with the prior art apparatus it was practically impossible to avoid marking of the foil by so-called chatter marks. The problem was most pronounced in the case of thicker foils and plates.

OBJECTS OF THE INVENTION

It is, therefore, the principal object of the present invention to provide a smoothing apparatus or device which is capable of producing products of higher surface quality than heretofore and, especially, which is capable of avoiding damage to the product surface or marking.

Another object of the invention is to provide an apparatus which can smooth foil or plate products of plastic without forming chatter marks thereon.

SUMMARY OF THE INVENTION

These objects and others which will become apparent hereinafter are attained, in accordance with the invention, in an apparatus for smoothing plastic foils and plates which comprises a smoothing roll and a smoothing roll drive. According to the invention, the smoothing roll drive includes a drive motor having a drive housing, a stator and a rotor, the stator and rotor each being cylindrical and being disposed coaxially with one another in the housing. The rotor is connected directly to a drive shaft of the roll without an intervening transmission.

When we refer to a stator and rotor which are coaxial with one another we mean to indicate that the stator and rotor have a common axis or axes which are located sufficiently close to one another that the stator and rotor can be deemed to be substantially coaxial. The stator and rotor thus have substantially parallel cylindrical outer surfaces and, advantageously, the cylindrical stator surrounds the cylindrical rotor. In other words the rotor is substantially centered in the space surrounded by the stator and both are annular.

The stator can have water-cooling passages according to the invention.

The drive motor of the invention is in the form of an electric motor capable of producing high torque at relatively low speed. Since the rotor is directly coupled to the roll, the rotor speed can correspond to the roll speed of the smoothing roll.

According to a feature of the invention, the rotor surrounds at least part of a connecting sleeve and is preferably fixed on this connecting sleeve. The drive shaft of the smoothing roll can then be fixed to the connecting sleeve. Advantageously the rotor surrounds a cylindrical part of the connecting sleeve which is preferably formed as a hollow cylinder. The rotor can then be fixed to this cylindrical part or hollow cylinder.

According to another feature of the invention, the drive shaft is connected directly with the connecting sleeve and the connecting sleeve can then form simultaneously an extension of the drive shaft. In a highly preferred embodiment of the invention, the drive shaft of the smoothing roll engages in a recess of the connecting sleeve which is opened at the smoothing roll side of the apparatus, this recess also being referred to as a socket herein.

Preferably, in this case, a connecting end of the drive shaft will engage in the recess of the connecting sleeve open at the smoothing roll side and which recess is itself of cylindrical configuration.

The connecting sleeve and rotor can form an assembly which can be journaled on an outer stationary housing part by a bearing, for example a ball or other roller bearing. The outer fixed housing part can also surround the stator and the rotor within the stator. This housing part is preferably of cylindrical configuration. In this embodiment, the connecting sleeve is supported on an outer housing part.

According to a further feature of the invention, on a back side of the drive housing, i.e. a side opposite that at which the roll is located, a back wall is provided which can be connected with the outer stationary housing part and can be used to mount an encoder for measuring the speed of the motor. The back wall is then fixed to the outer housing part which is likewise fixed and the encoder can be located centrally in the back wall and preferably fixed thereto by screws.

In another embodiment of the invention, the assembly of the connecting sleeve and rotor is supported upon an inner stationary housing part by one or more roller bearings. Advantageously this inner housing part is cylindrical and is received in the cylindrical space within the connecting sleeve. In this embodiment the encoder is affixed at a portion of the housing on the roll side, namely, on the inner housing part. Here again the encoder may be centrally mounted on the inner housing part.

The drive shaft of the smoothing roll can likewise be supported in a bearing on a support member, preferably adjacent the connection of the rotor therewith. In this manner an especially reliable support and stabilization of the drive shaft of the smoothing roll is obtainable.

With the apparatus of the invention, smoothing of foils and plates can be carried out to yield products with optimum quality. Surprisingly there are no detrimental chatter marks with the apparatus as compared with prior art systems. The transmission, i.e. gearing, between the electric motor and the roll which has hitherto been required is eliminated and there are thus fewer parts to wear or subject to stress and the need for transmission oil is eliminated. There is thus a reduction in the number of potential places for problems to arise. Maintenance is likewise reduced and the system of the invention provides a vibration-free and low noise operation utilizing an apparatus which occupies considerably less space and is more compact than earlier systems.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
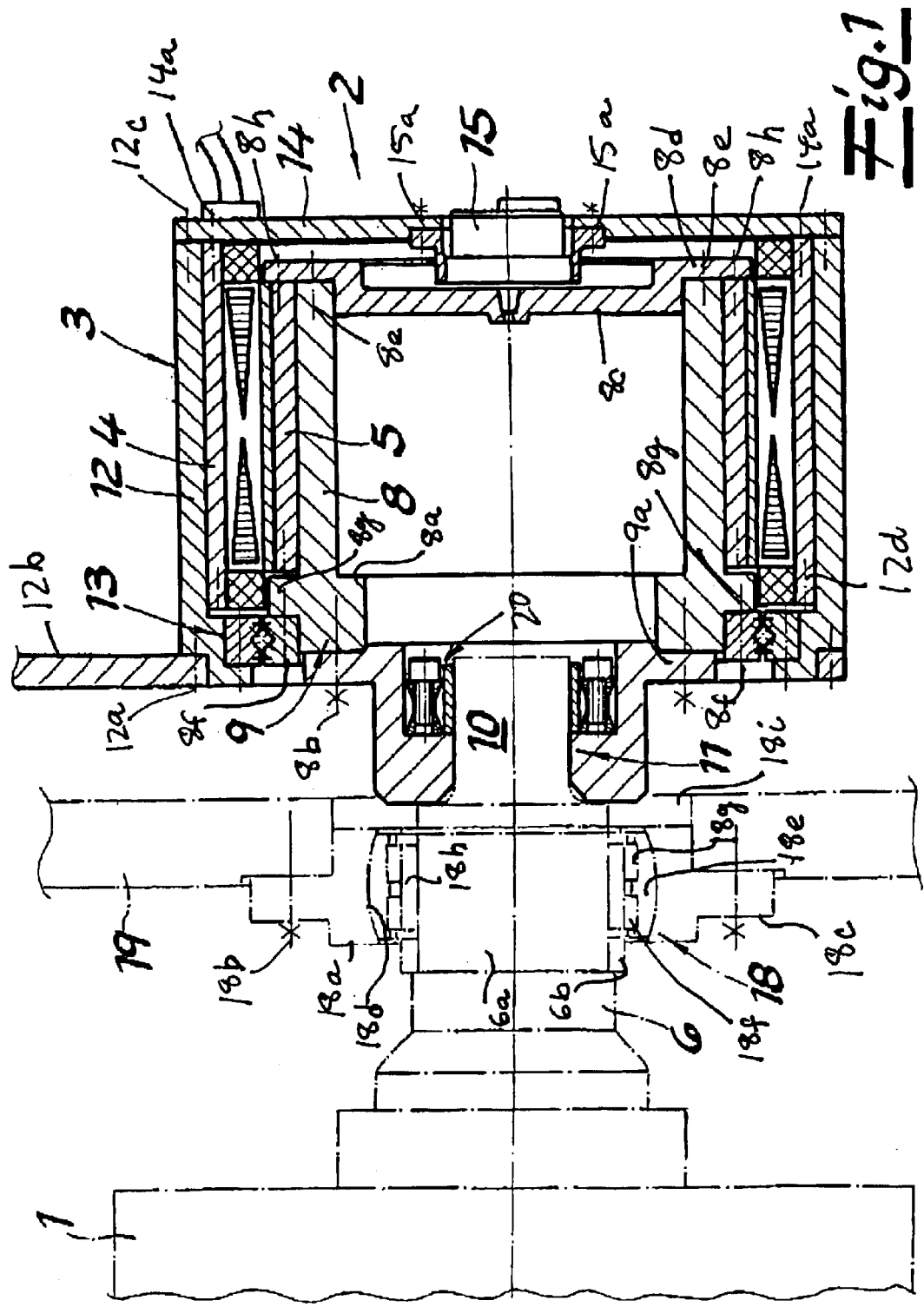
FIG. 1 is an axial section through the drive of a smoothing roll according to the invention, illustrating the smoothing roll in dot-dash lines and in accordance with a first embodiment of the invention.
Figure 2:
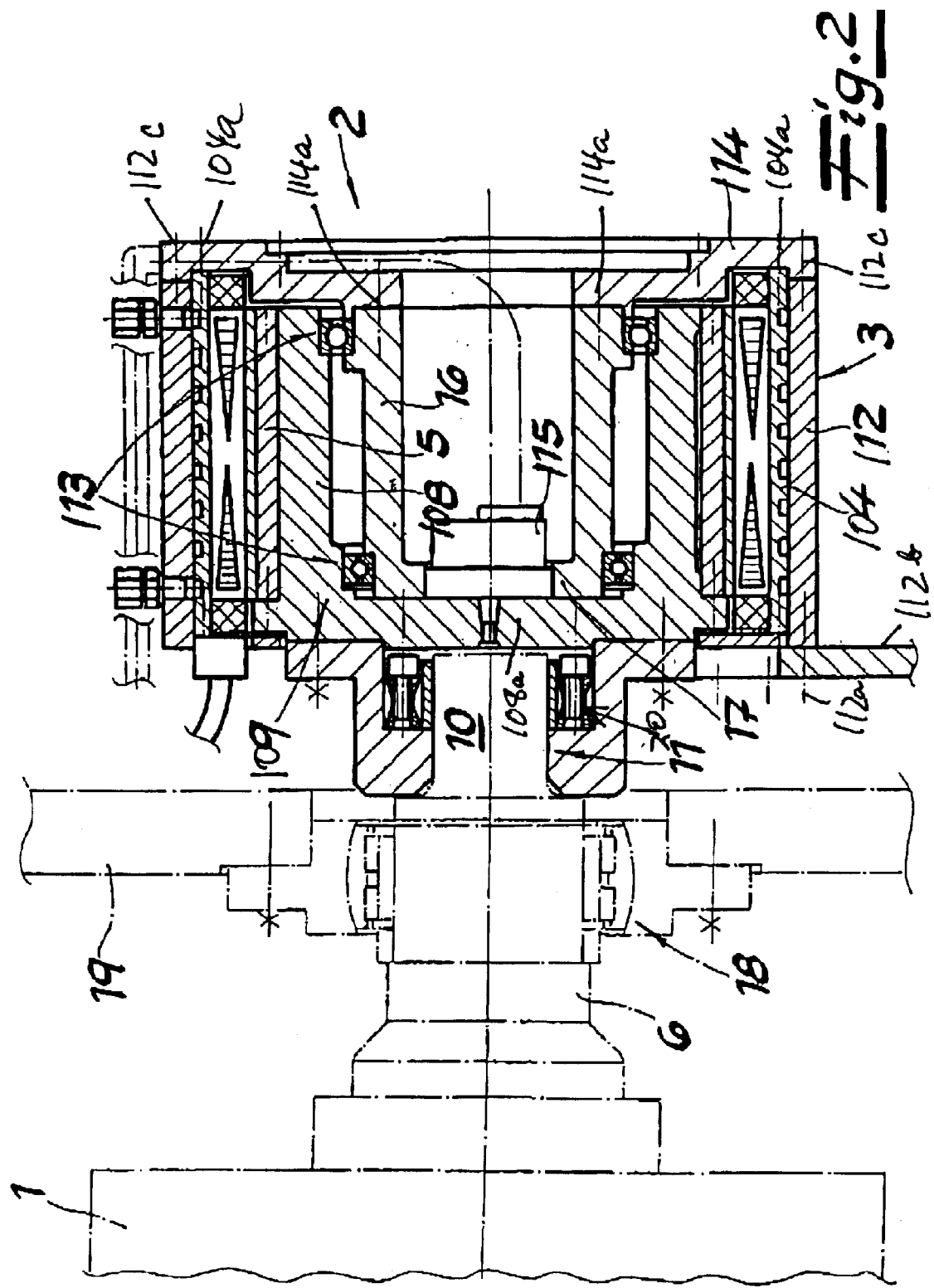
FIG. 2 is a view similar to FIG. 1 showing a second embodiment.

FIGS. 1 and 2 of the drawing show a smoothing apparatus for the smoothing of films or foils, sheets or plates of synthetic resin material (not shown) and comprising a smoothing roll 1 and a smoothing roll drive 2. The smoothing roll drive 2 is comprised of a drive housing 3 and a drive motor within that housing and formed by a stator 4 and a rotor 5.

Within the drive housing 3 the stator 4 and the rotor 5 are arranged coaxial to one another, i.e. with the rotor 5 surrounded by the stator 4 and both having a common axis. The cylindrical stator 4 surrounds the cylindrical rotor 5. The electric motor formed by the stator 4 and the rotor 5 is connected without any intervening transmission to a drive shaft 6 of the smoothing roll 1.

More particularly, the smoothing roll 1 can have its shaft 6 journaled in a sleeve aligning the bearing 18 which comprises a bearing housing 18a secured by bolts 18b through a frame 18c to a support in the form of a wall 19 separating the roll space from the motor space.

The bearing housing 18 forms a spherical seat 18d in which the outer race 18e can swivel. The outer race is provided with tracks for two rows of roller bearings 18f and 18g which engage the inner race 18h fixed on a cylindrical surface 6a of the shaft 6. A ring 6b serves to prevent shifting of the seat 18h to the left. Adjacent the bearing housing 18a is a washer 18i through which the shaft 6 extends to form a stub 19 onto which the socket 11 of the connecting sleeve 9 of the motor is fitted.

According to the invention, moreover, the rotor 5 is mounted on a hollow cylinder 8 which extends axially away from the smoothing roll 1 and has a shoulder 8a connected by bolts 8b to a flange 9a of the socket 11 to form the connecting sleeve 9.

At the opposite end of the hollow cylinder 8, a plate 8c is attached by its flange 8b and the bolts 8e to the hollow cylinder 8, to close the interior of the hollow cylinder. The rotor 5 is connected to the hollow cylinder 8 by bolts 8f extending through the outwardly extending flange 8g and by bolts 8h extending into the flange 8d mentioned earlier. Thus the rotor 5 is ultimately connected rotationally to the connecting sleeve 9. Since the drive shaft 6 is directly coupled to the connecting sleeve 9 without the intermediary of any transmission, the driven part of the motor is coupled to the roll 1 directly. The socket 11 is a hollow cylinder of the connecting sleeve 9 at the smoothing roll side.

In the embodiment of FIG. 1, upon rotation, the rotating parts of the assembly, namely the hollow cylinder 8 and the rotor 5, are supported via the connecting sleeve 9 on the outer fixed housing part 12 via a roller bearing 13. The outer housing part is a cylindrical portion of the drive housing to which the stator 4 is connected. For this purpose, the casing 12 can be connected by bolts 12a to a support 12b and by bolts 12c to a back wall 14 which, in turn, is connected by bolts 14a to the stator 4. The stator 4 in turn may be bolted at 12d to the casing 12. It can be seen that in the embodiment of FIG. 1, the inner race of the ball bearing 13 is joined to the connecting sleeve 9 while the outer race is secured to the casing part 12.

Preferably, in the embodiment of FIG. 1, the rear wall 14 also accommodates an encoder 15 for outputting a train of pulses which signal the speed of the rotor 5. The encoder 15 can be disposed centrally in the rear wall 14 and preferably is bolted at 15a thereto.

In the embodiment of FIG. 2, the rotor 5 is fixed to the hollow cylinder 108 whose connecting sleeve portion 109 forms the socket 11 as previously described for connection at 10 to the shaft of the smoothing roll 1. In this embodiment, the rotation part 5, 108, 109 is supported on ball bearings 113 on an inner stationary housing member 16 which is cylindrical and is held by a back plate 114. In this embodiment, the casing 112 is secured by the bolts 112a to the support 112b and the rear plate 114 is secured to the casing 112 by the bolts 112c. Bolts 114a connect the plate 114 to the housing part 16. The stationary part 16 is surrounded by and coaxial with the hollow cylinder 108. The stator 104 in this embodiment is connected by bolts 104a with the back plate 114.

In the embodiment of FIG. 2, at the smoothing roll side of the motor, an encoder 115 is mounted on the inner stationary housing part 16. The encoder 115 can be provided centrally in the end face 17 of the housing part 16 to respond to the rotation of the portion 108a of the member 108 juxtaposed therewith.

The bearing 18 and the bearing 13 and 113 which have been described support the rotating part on stationary parts in such manner that no vibration or chatter is delivered to the smoothing roll. A clamping assembly 20 can be provided to brace the connecting sleeve 10 via the socket 11 against the shaft stub 10.

We claim:

1. An apparatus for smoothing plastic foils and plates, comprising a smoothing roll and a smoothing roll drive for said smoothing roll, said smoothing roll drive including a drive motor having a drive housing, a stator and a rotor, the stator and rotor each being cylindrical and being disposed coaxially with one another in said housing, said rotor being connected directly to a drive shaft of said roll without an intervening transmission.

2. The apparatus defined in claim 1, further comprising a connecting sleeve at least partly surrounded by said rotor and fixed to said rotor, said connecting sleeve being fixed to said shaft.

3. The apparatus defined in claim 2 wherein said drive shaft extends into a socket of said connecting sleeve opening toward said roll.

4. The apparatus defined in claim 3 wherein said connecting sleeve and said rotor form an assembly journaled by a bearing on said housing.

5. The apparatus defined in claim 4 wherein said housing is closed on a side opposite said roll by a back wall, said apparatus further comprising an encoder on said back wall for signalling a speed of said motor.

6. The apparatus defined in claim 3 wherein a cylindrical internal part of said housing extends into and is surrounded by said sleeve, said sleeve and said rotor forming an assembly journaled by at least one bearing on said internal part of said housing.

7. The apparatus defined in claim 6, further comprising an encoder for signalling a speed of said motor mounted on said internal part of said housing.

8. The apparatus defined in claim 2 wherein said connecting sleeve and said rotor form an assembly journaled by a bearing on said housing.

9. The apparatus defined in claim 8 wherein said housing is closed on a side opposite said roll by a back wall, said apparatus further comprising an encoder on said back wall for signalling a speed of said motor.

10. The apparatus defined in claim 2 wherein a cylindrical internal part of said housing extends into and is surrounded by said sleeve, said sleeve and said rotor forming an assembly journaled by at least one bearing on said internal part of said housing.

11. The apparatus defined in claim 10, further comprising an encoder for signalling a speed of said motor mounted on said internal part of said housing.

12. The apparatus defined in claim 1, further comprising a bearing journalling said shaft on a support.

* * * * *